July 1, 1952 L. LEE, II 2,601,870
VALVE MECHANISM
Filed Nov. 21, 1947
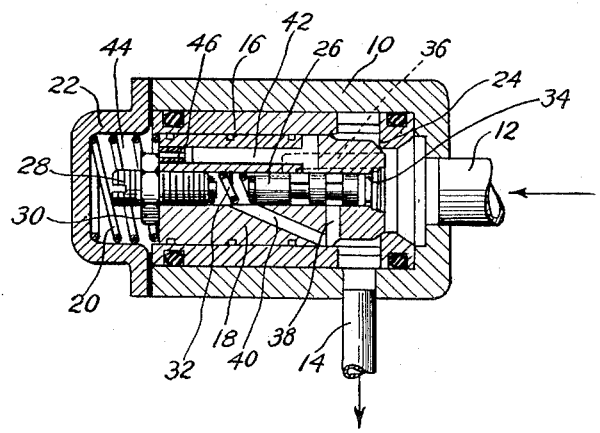
INVENTOR
Leighton Lee II
BY
ATTORNEY Patented July 1, 1952

2,601,870

UNITED STATES PATENT OFFICE 2,601,870

VALVE MECHANISM

Leighton Lee II, Rocky Hill, Conn., assignor to Niles-Bement-Pond Company, West Hartford, Conn., a corporation of New Jersey Application November 21, 1947, Serial No. 787,417

11 Claims. (Cl. 137—490)

The present invention relates to relief valve mechanisms for maintaining a fluid pressure at a substantially constant value.

The present invention is an improvement on the device shown in my Pat. No. 2,580,030 issued December 25, 1951. In that application I have shown a pressure regulating valve controlled by a pilot valve subject to the pressure being regulated acting thereon in one direction and to the force of a spring acting thereon in the opposite direction. That pilot valve controls the pressure in a regulating chamber wherein the pressure acts on the main valve in opposition to the pressure being regulated. When the forces acting on the pilot valve are balanced, said valve has a central neutral position in which it holds the regulating chamber pressure constant; and when said forces are unbalanced, said valve moves in either direction from its central neutral position, depending upon the magnitude and direction of the net force acting on said valve. When said pivot valve moves in one direction from its central neutral position, it increases the regulating chamber pressure and when it moves in the opposite direction, it decreases that pressure. The result is that the spring which loads the pilot valve is always compressed exactly the same amount regardless of the opening of the main valve. In that way, the main valve is enabled to move thru a wide range of positions without substantial change in the regulated pressure. This is in contrast to the usual type of relief valve mechanism, wherein the main valve is biased closed by a spring, and the regulated pressure must increase slightly for each opening movement of the valve because of the increased spring force obtaining at the wider open position.

It is an object of the present invention to provide an improved valve mechanism of the type described in my previous application.

Another object is to provide a more compact structure operating in accordance with the principles of my previous application.

A further object is to provide a valve mechanism in which the main valve takes the form of a piston moving within a cylinder, and the pilot valve moves in a bore in the piston and controls the pressure acting on one end of the piston.

Other objects and advantages of my invention will become apparent from a consideration of the appended specification, claims and drawings, in which the single figure shows a cross sectional view of a relief valve mechanism embodying my invention.

Referring to the drawing, there is shown a generally cup-shaped housing 10 provided with openings to receive an inlet conduit 12 and an outlet conduit 14. A sleeve 16 is received within the housing 10 and is formed at its right end to provide an inlet port aligned with the conduit 12 and a valve seat surrounding the inlet port. The outlet conduit 14 is connected to a series of radial outlet ports.

A piston valve 18 is mounted for translation within the sleeve 16. A spring 20 is received between the piston valve 18 and a cover 22, and biases the valve 18 toward the inlet seat 24.

The piston 18 is provided with a central bore in which moves a pilot valve 26. The left end of the bore is threaded to receive a threaded plug 28, provided with a lock nut 30 to hold it in any adjusted position. A spring 32 is held in compression between the plug 28 and the valve 26, and biases the valve for movement to the right. Movement of the valve toward the right is limited by some suitable means such as a flange on the edge of the bore in which the valve moves, as indicated at 34, in order to retain valve 26 in said bore when the inlet pressure is zero.

A passage 36 leads from the inlet pressure end of the piston valve 18 to the bore in which the valve 26 moves. A second passage 38 leads from the outlet port through the piston 18 to said bore. A third passage 40 leads from the outlet port to said bore at the left end of valve 26. A fourth passage 42 leads from said bore through the piston to a chamber 44 formed between the left end of the piston and the cover 22. The passage 42 is provided with a restriction 46 to slow the flow of liquid therethrough.

When the inlet pressure is at a selected control point value determined by the setting of plug 28 and the valve 26 is in its central neutral position wherein the passage 42 is closed, then the pressure in chamber 44 is fixed, and the inlet pressure acting on the right end of the piston valve 18 is balanced against the force of spring 20 and the pressure in chamber 44 acting on the left end of said piston.

If the inlet pressure rises above the selected control point value determined by the setting of plug 28, then valve 26 is moved to the left against spring 32, and thereby opens communication between passage 42 and passage 38. This allows some of the fluid in chamber 44 to drain out through passages 42 and 38 to the discharge port 14. The pressure in chamber 44 is thereby reduced, and the main piston valve 18 moves to the left, thereby providing a larger opening for the lowering of the inlet pressure. This motion continues until equilibrium is restored between the forces acting on opposite ends of the pilot valve 26. In a similar manner, if the inlet pressure falls below the desired control point value, valve 26 moves to the position shown in the drawing, connecting chamber 44 through passages 42 and 36 to the inlet end of piston 18. The pressures acting on opposite ends of piston 18 are then equalized, and the piston moves toward closed position under the influence of spring 20 until the piston valve 18 opening is decreased sufficiently to restore the inlet pressure to its desired control point value, which returns valve 26 to its central neutral position. It will be noted that valve 26 is always in its central neutral position when the forces acting thereon are balanced, and any unbalance of said forces moves said valve in either direction until equilibrium of said forces is restored. A valve functioning in this manner is regarded as being of the "floating" type, since it is free to move in either direction from its central neutral position, and does so move in response to any fluctuation of inlet pressure which causes an unbalancing of the forces acting on said valve.

During operation of my improved valve mechanism piston valve 18 is always partly open; the degree of opening depending upon the magnitude of the unbalance of the forces acting on said valve. Accordingly, in operation valve 18 is not intended to contact with its seat 24, but like pilot valve 26, floats in sleeve 16 in response to fluctuations in the forces acting upon valve 18. Such a piston valve for the purpose of this description is regarded as a "floating" piston valve.

The restriction 46 is provided to slow the movements of piston 18 so as to prevent it from overshooting or "hunting" about the position which will restore equilibrium to pilot valve 26.

It may be seen from the foregoing that the main piston valve 18 may assume any position required to maintain the forces acting on the pilot valve 26 in equilibrium. Furthermore, it may be seen that the inlet pressure acting on the right end of pilot valve 26 is always the same when that valve is in equilibrium. Changes in the force of spring 20 at different positions of piston 18 are compensated by changes in the pressure in chamber 44. Therefore, there is substantially no pressure regulation between the fully closed position of the main valve 18 and the fully open position.

The terms and expressions as used herein are intended as terms of description and not of limitation, and I have no intention, in the use of such terms and expressions, of excluding any equivalent structure or any parts thereof, but recognize that many modifications are possible within the scope of the appended claims.

I hereby claim as my invention:

1. Pressure regulating valve mechanism for maintaining a pressure to be regulated at a constant selected control point value, comprising a cylinder, a floating piston translatable in said cylinder, an inlet port opening into one end of said cylinder for supplying thereto fluid whose pressure is to be regulated, an outlet port opening thru a lateral wall of said cylinder adjacent said one end for conveying fluid therefrom to a point at a substantially lower pressure, spring means biasing said piston toward engagement with said inlet port to regulate fluid communication between said inlet and outlet ports, said piston and cylinder forming a closed chamber between the ends thereof opposite said inlet, a bore in said piston, a first passage in said piston always open at one end and connecting said bore and the inlet end of said piston, a second passage in said piston connecting said bore and said outlet port, and a third passage in said piston connecting said bore and said chamber, a plug closing the end of said bore adjacent said chamber, means for adjusting said plug in said bore, a floating pilot valve in said bore having one end subject to the pressure to be regulated, a fourth passage in said piston connecting the end of said bore adjacent said plug to said outlet port, a spring retained between said plug and said valve and biasing said valve for movement toward the open end of said bore, said passages and said valve cooperating so that said valve has a central neutral position in which it closes said third passage when the pressure to be regulated is at its selected control point value, and said valve is effective upon opposite movements from said position to connect said third passage selectively to said first or second passages, thereby respectively increasing or decreasing the pressure in said chamber to cause a closing or opening movement of said piston with respect to said inlet port, said movement continuing until the pressure differential acting on said valve is balanced against said spring and said valve is at its central neutral position.

2. Pressure regulating valve mechanism for maintaining a pressure to be regulated at a constant selected control point value, comprising a cylinder, inlet and outlet ports opening into said cylinder adjacent one end thereof, a floating piston translatable in said cylinder to regulate communication between said inlet and outlet ports, spring means biasing said piston toward a position in which it prevents such communication, said piston and cylinder forming a closed chamber at the end of said cylinder spaced from said ports, said piston having a bore therein open at one end adjacent said inlet port, said piston having three passages therein connecting said bore with said inlet port, said outlet port and chamber, respectively, a floating pilot valve movable in said bore under the influence of the inlet pressure at said open end, a spring in said bore acting on said valve in opposition to said inlet pressure, said valve having a central neutral position in which the passage leading to said chamber is closed when said inlet pressure is at its selected control point value, said valve being moved to said central neutral position when said inlet pressure equals a value sufficient to deflect said spring by a predetermined amount; said valve also being effective when said inlet pressure exceeds said value to open the passages connecting said chamber with said bore and said bore with said outlet port so as to reduce the pressure in said chamber and thereby cause a movement of said piston in a direction to increase the flow thru said outlet port and thereby reduce said inlet pressure to said control point value; and said valve being effective when said inlet pressure falls below said value to move in the opposite direction from its central neutral position and open the passages connecting said chamber with said bore and said bore with said inlet port so as to increase the pressure in said chamber and thereby cause a movement of said piston in a direction to decrease the flow thru said outlet port and thereby increase said inlet pressure to said control point value.

3. Pressure regulating valve mechanism as in claim 2, in which said piston has an additional passage connecting the closed end of said bore to said outlet port so that said valve is subject to the outlet pressure acting thereon in opposition to said inlet pressure.

4. Pressure regulating valve mechanism as in claim 2, including means for adjusting the force of said spring and thereby adjusting the value of said inlet pressure regulated by said valve mechanism.

5. Pressure regulating valve mechanism as in claim 2, including a restriction in the passage connecting said chamber and said bore to delay the flow of fluid therethru and thereby prevent hunting of said valve mechanism.

6. Fluid pressure regulating valve mechanism for maintaining a pressure to be regulated at a constant selected control point value, comprising a floating main pressure regulating valve having a fluid inlet and a fluid outlet and whose operation is controlled by a floating pilot valve that is subject to the pressure to be regulated and which is adapted to control the pressure in a regulating chamber wherein the pressure acts on said main valve in opposition to the pressure to be regulated; said main valve having a passageway connecting said chamber with a port through which communication is alternatively established with said fluid inlet or outlet; said pilot valve having a central neutral position in which it closes said port and thereby holds the pressure in said regulating chamber constant; said pilot valve being adapted upon movement in one direction from said central neutral position to increase said regulating chamber pressure and upon movement in the opposite direction from said central position to decrease said regulating chamber pressure; whereby said main valve is so operated as to maintain the pressure to be regulated at a constant selected control point value.

7. Fluid pressure regulating mechanism as in claim 6, wherein said pilot valve is actuated by a spring acting in opposition to the pressure to be regulated and is adapted to be compressed the same amount regardless of the opening of said main valve.

8. Fluid pressure regulating mechanism as in claim 6, wherein said main valve is adapted to move through a wide range of positions without appreciable change in the regulated pressure.

9. Fluid pressure regulating mechanism as in claim 6, wherein the movements of said main valve are retarded by a restriction in a conduit which connects said regulating chamber with the inlet to and outlet from said main valve.

10. Pressure regulating valve mechanism for maintaining a pressure to be regulated at a constant selected control point value, comprising: a cylinder, a floating piston translatable in said cylinder, said cylinder having inlet and outlet ports therein, said inlet ports being regulated by translation of said piston, a chamber formed between one end of said piston and said cylinder, a spring in said chamber biasing said piston toward closed position; said spring and piston being so arranged that changes in the forces of said spring at different position to said piston are compensated by changes in the pressure in said chamber; said piston having a bore therein and passages therethrough connecting said bore with said chamber and with said inlet and outlet ports; a floating pilot valve movable in said bore in opposite directions from a central neutral position therein to selectively connect said chamber to said inlet and outlet ports, said valve being subject at one end to the pressure at said inlet, and a spring biasing said valve in opposition to said inlet pressure; said valve being always in its central neutral position when said inlet pressure is at selected control point value.

11. Pressure regulating valve mechanism for maintaining a pressure to be regulated at a constant selected control point value, comprising: a cylindrical casing having a fluid inlet containing fluid under pressure to be regulated, and a fluid outlet; a piston valve slidably mounted in said casing and adapted to control the flow of fluid from said inlet to said outlet, a spring biasing said valve toward closed position in opposition to inlet pressure acting on said valve; a closed chamber communicating with the end of said piston valve opposite said inlet, and a passageway in said piston from said chamber adapted to be alternatively connected with said inlet or said outlet; a floating pilot valve slidably mounted in said piston and having one end subjected to said inlet pressure and its other end to the force of an adjustable spring, so that said pilot valve occupies a central neutral position in which it closes said passageway when a first force of said inlet pressure on said pilot valve balances a second force of said adjustable spring thereon; said pilot valve being always in its central neutral position when said inlet pressure is at a selected control point value, said pilot valve being also adapted to move in one direction from said central position, whenever said first force exceeds said second force, and open communication between said chamber and said outlet, thereby reducing the pressure in said chamber, and to move in the opposite direction whenever said second force exceeds said first force, and alternatively open communication between said chamber and said inlet and thereby increase the pressure in said chamber; whereby said piston valve is moved to control the flow of fluid from said inlet to said outlet so as to maintain said inlet pressure constant at a selected control point value, determined by the force of said adjustable spring.

LEIGHTON LEE II.

REFERENCES CITED

The following references are of record in the file of this patent:

UNITED STATES PATENTS

| Number | Name | Date |
| --- | --- | --- |
| 191,078 | Scorell | May 22, 1877 |
| 534,514 | Mellin | Feb. 19, 1895 |
| 2,225,916 | Maglott | Dec. 24, 1940 |
| 2,249,206 | Hubbard | July 15, 1941 |

OTHER REFERENCES

Ser. No. 404,526, Kleeberger (A. P. C.), published May 11, 1943.